United States Patent
Liao et al.

(10) Patent No.: US 7,950,810 B2
(45) Date of Patent: May 31, 2011

(54) ADJUSTMENT MODULE FOR ADJUSTING A POSITION OF A LENS OF A PROJECTOR

(75) Inventors: Hsien-Hsuan Liao, Hsinchu (TW); Sheng-Yi Chen, Hsinchu (TW); Yi-Te Liao, Hsinchu (TW); Wen-Wei Tsai, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 691 days.

(21) Appl. No.: 12/017,349

(22) Filed: Jan. 22, 2008

(65) Prior Publication Data

US 2009/0040479 A1     Feb. 12, 2009

(30) Foreign Application Priority Data

Aug. 7, 2007  (TW) ............................... 96129010 A

(51) Int. Cl.
*G03B 5/02* (2006.01)
*G02B 15/14* (2006.01)
(52) U.S. Cl. ...................................... 353/101; 359/694
(58) Field of Classification Search .................. 353/101; 359/694, 699, 703
See application file for complete search history.

(56) References Cited

U.S. PATENT DOCUMENTS

| | | | | |
|---|---|---|---|---|
| 3,997,245 | A | * | 12/1976 | Uesugi ........................... 359/705 |
| 4,778,232 | A | * | 10/1988 | Irby ............................. 359/211.1 |
| 6,005,723 | A | * | 12/1999 | Kosaka et al. ................ 359/822 |
| 6,547,402 | B2 | * | 4/2003 | Masuda ......................... 353/101 |
| 6,755,540 | B1 | * | 6/2004 | Runco ........................... 353/101 |
| 6,909,560 | B2 |  | 6/2005 | Lin et al. |
| 7,014,324 | B2 | * | 3/2006 | Jang ............................... 353/101 |
| 7,055,971 | B2 | * | 6/2006 | Gishi ............................. 353/101 |
| 7,460,776 | B2 | * | 12/2008 | Hirunuma et al. ............. 396/55 |
| 7,489,457 | B1 | * | 2/2009 | Chen et al. .................... 359/819 |
| 7,573,651 | B2 | * | 8/2009 | Wei et al. ...................... 359/694 |
| 7,635,190 | B2 | * | 12/2009 | Nakamura ..................... 353/101 |
| 2002/0001067 | A1 | * | 1/2002 | Tachibana ..................... 353/101 |
| 2002/0044264 | A1 | * | 4/2002 | Lu ................................. 353/101 |
| 2002/0154278 | A1 | * | 10/2002 | Masuda ......................... 353/101 |
| 2004/0114115 | A1 | * | 6/2004 | Runco ........................... 353/101 |
| 2005/0030492 | A1 | * | 2/2005 | Gishi ............................. 353/101 |
| 2005/0083585 | A1 | * | 4/2005 | Lin et al. ....................... 359/694 |
| 2009/0040479 | A1 | * | 2/2009 | Liao et al. ..................... 353/101 |

* cited by examiner

*Primary Examiner* — John R Lee
(74) *Attorney, Agent, or Firm* — Jianq Chyun IP Office

(57) ABSTRACT

An adjustment module is capable of adjusting a position of a lens of a projector. The adjustment module includes a base, a first tray, a second tray, at least one guide roller, and at least one boundary constrainer. The first tray is slidably disposed on the base along a first axis. The second tray is slidably disposed on the first tray along a second axis substantially perpendicular to the first axis. The lens is fixed on the second tray. The guide roller is rotatably disposed on the second tray. The boundary constrainer is disposed on the base. The guide roller is capable of confining the lens within an image area of the lens by rotatably contacting the boundary constrainer.

8 Claims, 13 Drawing Sheets

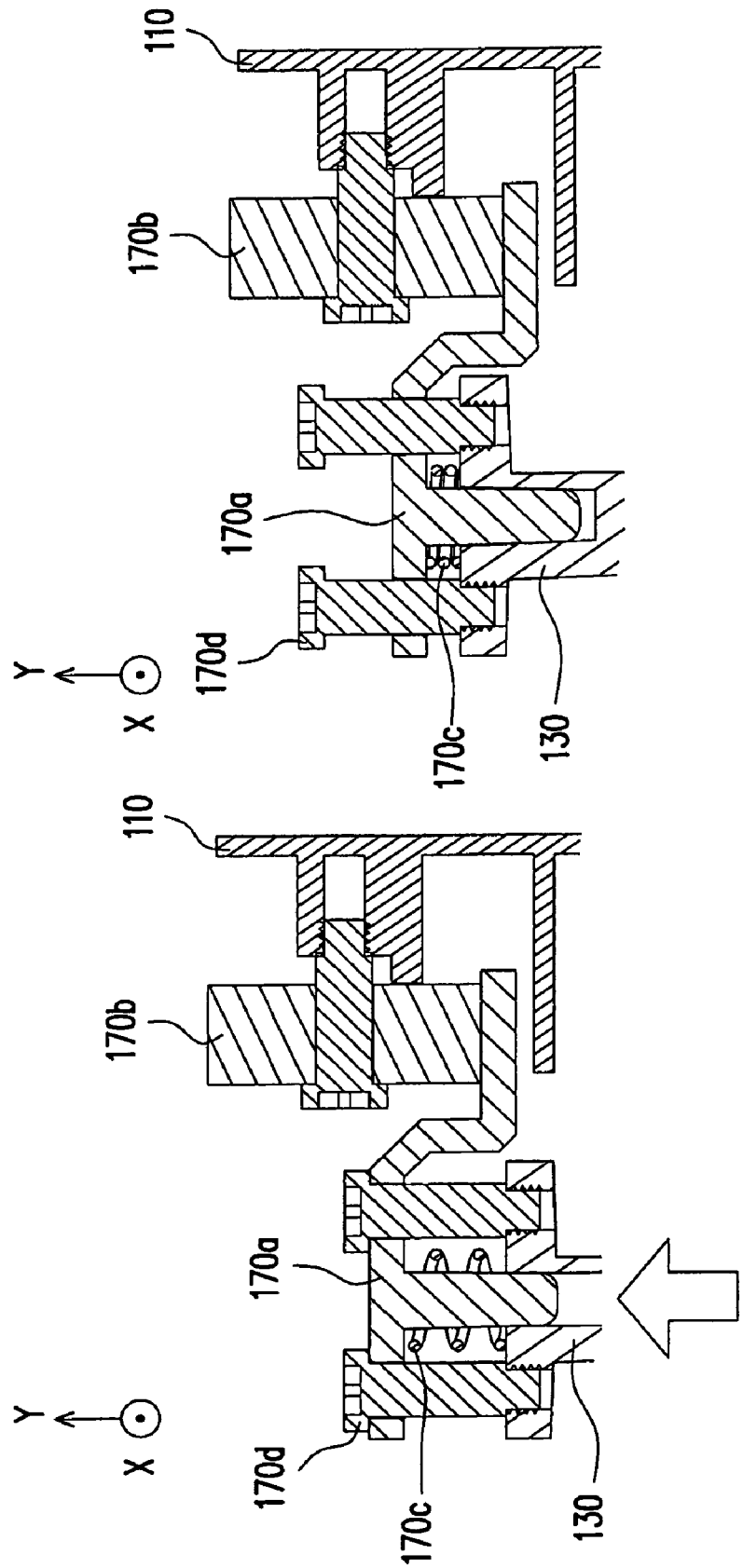

ADJUSTMENT MODULE FOR ADJUSTING A POSITION OF A LENS OF A PROJECTOR

CROSS-REFERENCE TO RELATED APPLICATION

This application claims the priority benefit of Taiwan application Ser. No. 96129010, filed on Aug. 7, 2007. The entirety of the above-mentioned patent application is hereby incorporated by reference herein and made a part of this specification.

BACKGROUND OF THE INVENTION

1. Field of the Invention

The present invention relates to an adjustment module, and more particularly to an adjustment module for adjusting a position of a lens of a projector.

2. Description of Related Art

In a conventional projector, a horizontal moving mechanism and a vertical moving mechanism are used to adjust a position of a lens by moving the lens in a predetermined movement range horizontally and vertically. Consequently, the horizontal and vertical movements of the lens are separated. Therefore, a user cannot adjust the position of the lens in horizontally and vertically simultaneously when operating the conventional moving mechanisms.

FIG. 1 illustrates a lens center of a lens of a conventional projector is adjusted in a movement range. Referring to FIG. 1, a lens of a conventional projector can be moved by horizontal and vertical moving mechanisms of the conventional projector. A lens center 30 of the lens is confined to be moved within a movement range 40 defined in correspondence with an image area of a lens, so that the lens is confined within the image area. Point B is an uppermost point of the movement range 40 vertically. Therefore, in order to move the lens center 30 from Point A to Point B, the user must firstly move the lens center 30 from Point A to Point A' vertically with the vertical moving mechanism, then move the lens center 30 from Point A' to Point B' horizontally with the horizontal moving mechanism, and finally move the lens center 30 from Point B' to Point B vertically with the vertical moving mechanism.

The user is unable to know whether the lens has reached the uppermost point of the image area, i.e. the lens center 30 has reached Point B. Therefore, when the adjusted lens center 30 is at Point A', the user may mistakenly think that the lens has reached the uppermost point of the image area when the lens cannot be moved upwards anymore.

In order to know whether the lens has reached the uppermost point of the image area, when the lens is within the image area, the user must firstly move the lens horizontally. If the lens cannot be moved upwards after being moved horizontally, it indicates that the lens has reached the uppermost point of the image area. Otherwise, if the lens can be moved upwards after being moved horizontally, the user must repeat the above operations to test whether the lens has reached the uppermost point of the image area.

However, the conventional horizontal and vertical moving mechanisms are operated to separately adjust the position of the lens within the image area vertically or horizontally, but cannot move the lens vertically and horizontally at the same time. Thus, it is quite inconvenient and the user may mistakenly think that the lens has reached the uppermost point of the image area.

SUMMARY OF THE INVENTION

The present invention is directed to an adjustment module for adjusting a position of a lens of a projector, which is convenient for a user to adjust the position of the lens of the projector.

An embodiment of the present invention provides an adjustment module for adjusting a position of a lens of a projector. The adjustment module includes a base, a first tray, a second tray, at least one guide roller, and at least one boundary constrainer. The first tray is disposed on the base slidably along a first axis. The second tray is disposed on the first tray slidably along a second axis substantially perpendicular to the first axis. The lens is fixed on the second tray. The guide roller is rotatably disposed on the second tray. The boundary constrainer is fixed on the base, and the guide roller is capable of confining the lens within an image area of the lens by being rotatably in contact with the boundary constrainer.

Another embodiment of the present invention provides an adjustment module for adjusting a position of a lens of a projector. The adjustment module includes a base, a first tray, a second tray, at least one rocker arm, and at least one slider block. The first tray is disposed on the base slidably along a first axis and has a first driving groove. The second tray is disposed on the first tray slidably along a second axis substantially perpendicular to the first axis. The lens is fixed on the second tray. The rocker arm is pivotally disposed on the base and has a second driving groove and a first driven post capable of moving in the first driving groove. The slider block is disposed on the base substantially slidably along the first axis, and has a second driven post capable of moving in the second driving groove. The first tray slides to drive the rocker arm to rotate by virtue of the first driving groove and the first driven post, and the rocker arm rotates to drive the slider block to slide by virtue of the second driving groove and the second driven post. Thus, the slider block slides in correspondence with the sliding of the first tray, so as to confine a sliding range of the second tray sliding along the second axis and to confine the position of the lens in an image area of the lens.

In view of the above, the guide roller and the boundary constrainer are used to confine a movement range of the lens. Thus, when the user intends to adjust the lens to an uppermost point or a lowermost point in the image area, the user only needs to adjust the lens along the first axis. If the lens has reached the boundary of the image area before reaching the uppermost point or the lowermost point, the user only needs to continue adjusting the lens along the first axis, and then the lens is guided to the uppermost or lowermost point of the image area. As such, the user can adjust the lens more conveniently. Furthermore, the user can use the leadscrew as a part of a moving mechanism along the first axis, so that the adjustment module does not cause the lens to produce a shift along the first axis due to the weight of the lens. Therefore, the adjustment module can be used to carry a heavy lens.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a partial cross-sectional view of the adjustment module in FIG. 2.

FIG. 5 is a partial cross-sectional view of the adjustment module in FIG. 4 when the adjustment module is adjusted along the first axis.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
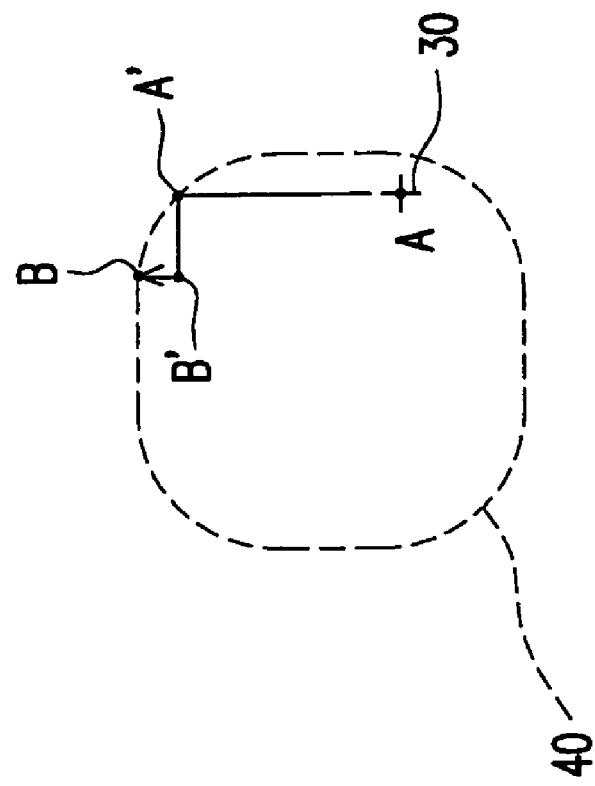
FIG. 1 illustrates a lens center of a lens of a conventional projector is adjusted in a movement range.
Figure 2:
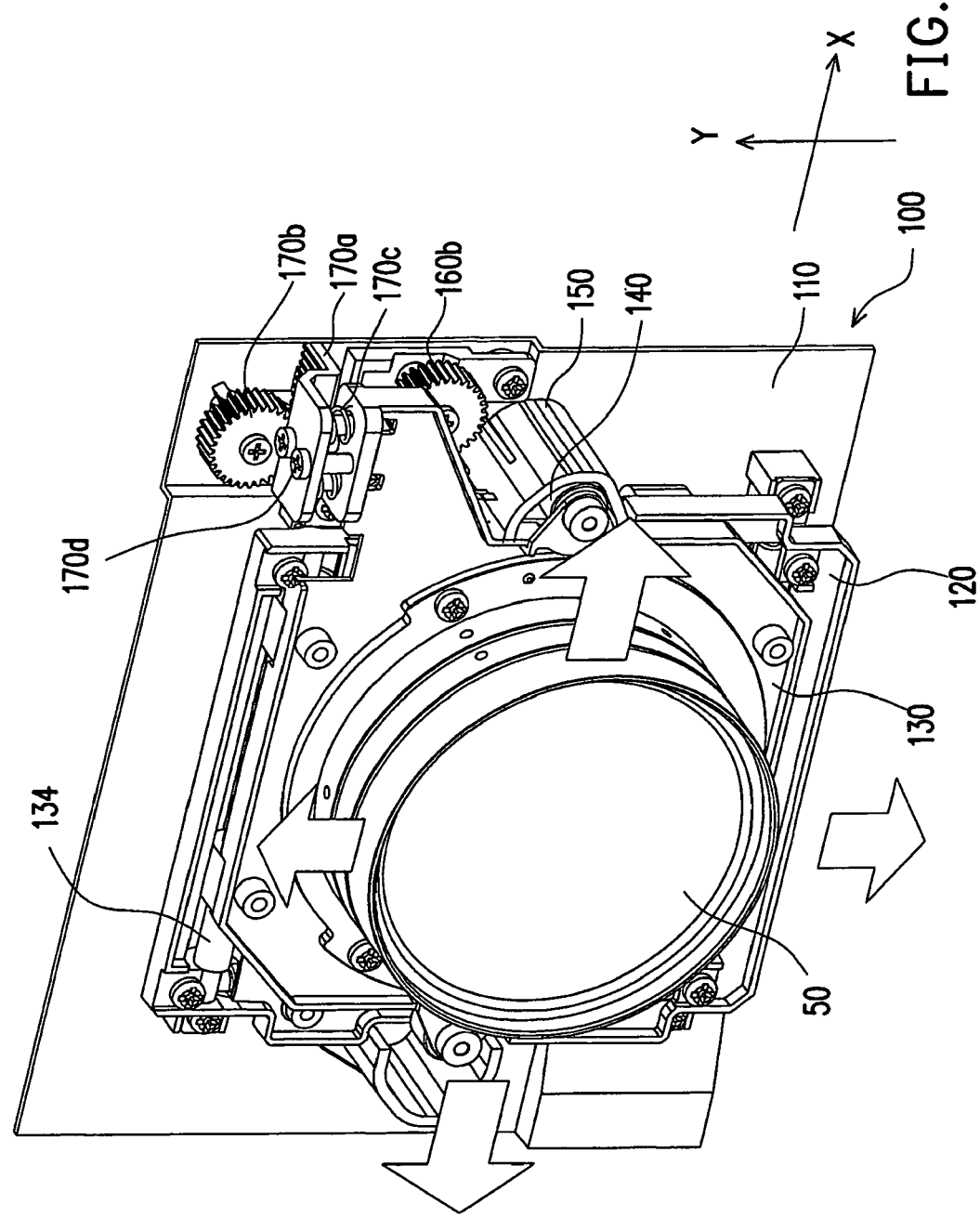
FIG. 2 is a perspective view of an adjustment module for adjusting a position of a lens of a projector according to an embodiment of the present invention.
Figure 3:
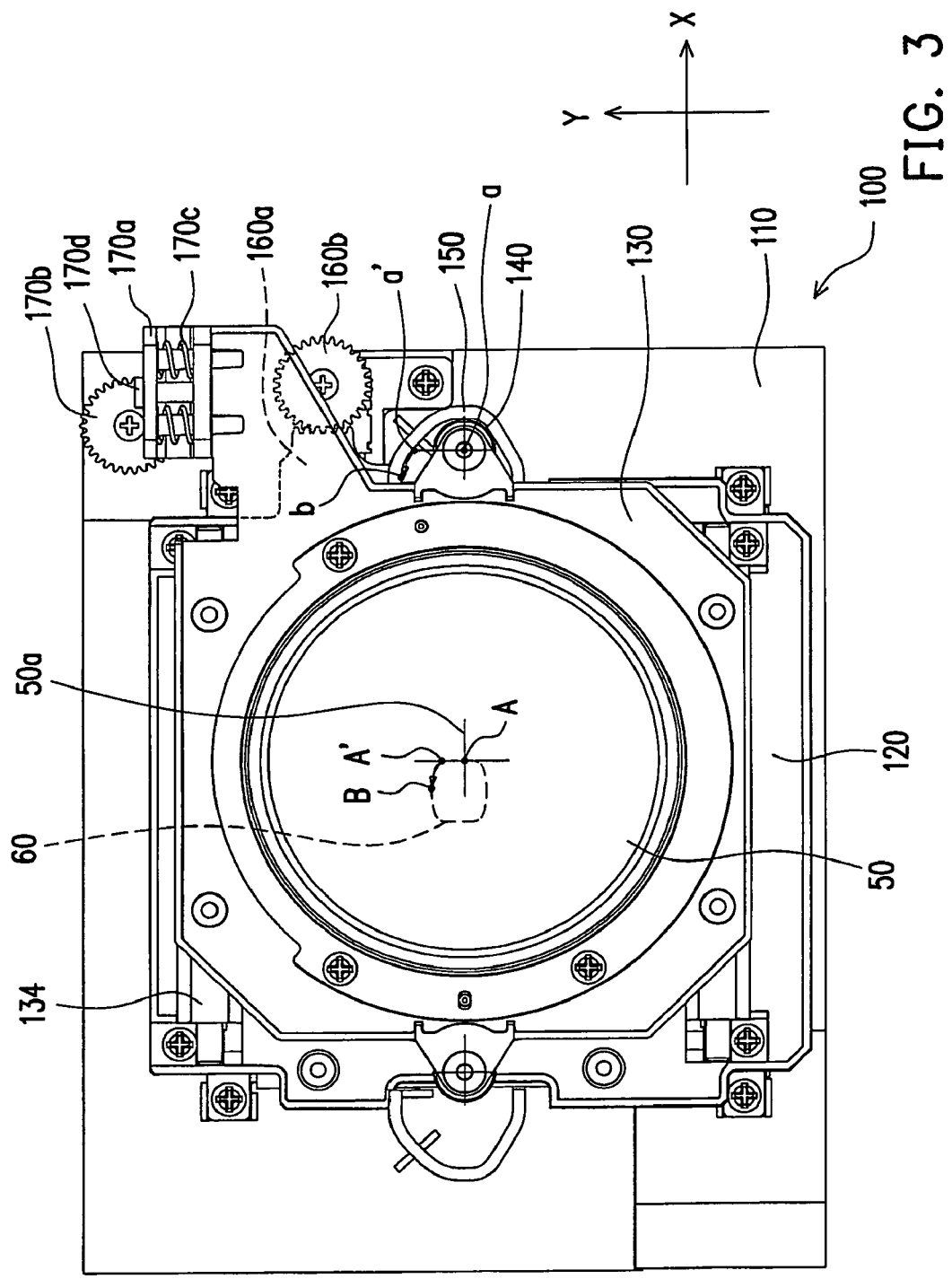
FIG. 3 is a top view of the adjustment module in FIG. 2.
Figure 6:
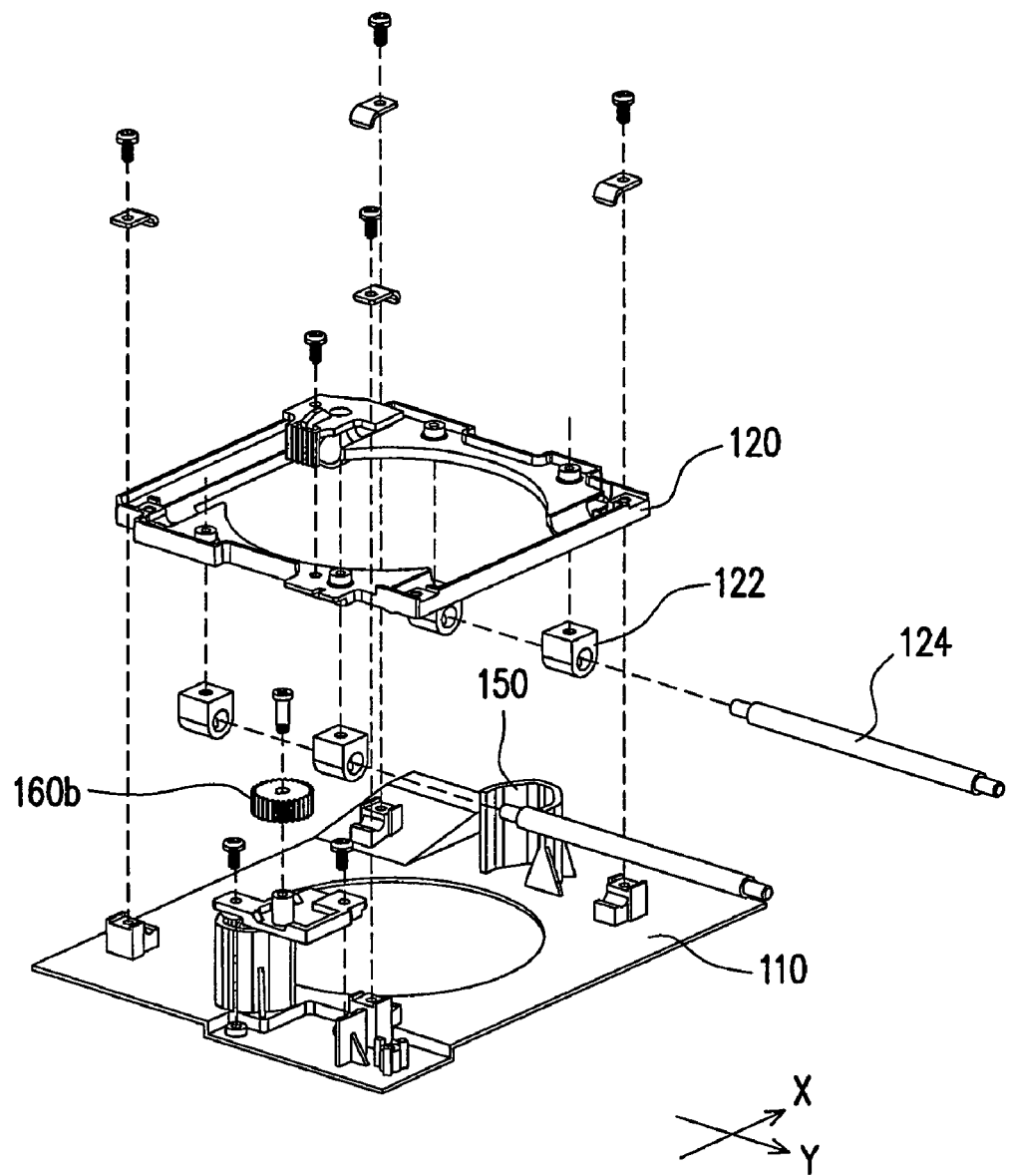
FIGS. 6-9 illustrate a process of assembling the adjustment module in FIG. 2.
Figure 7:
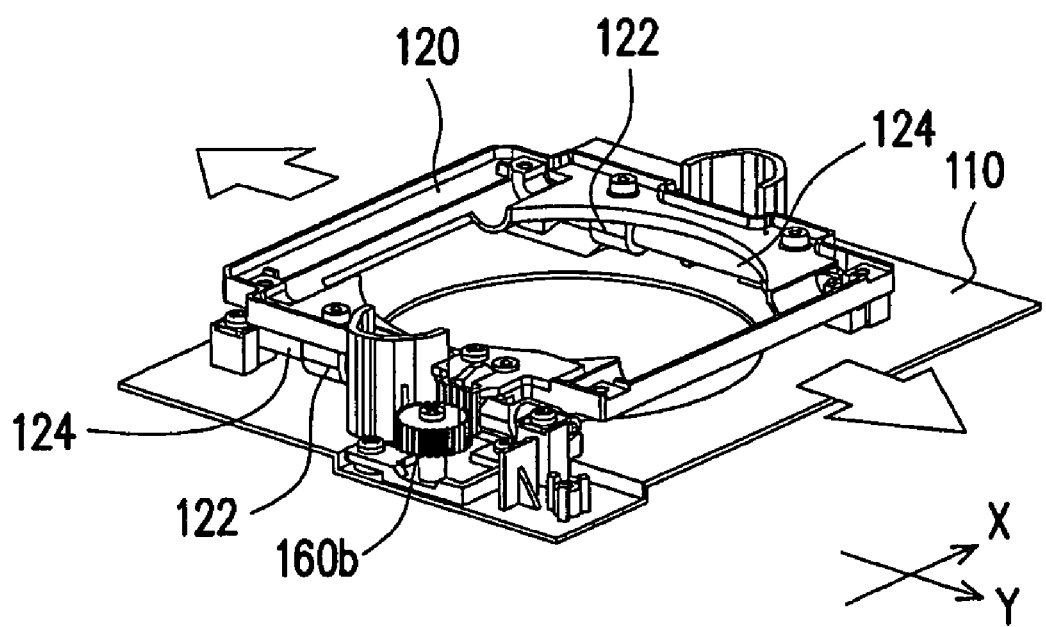

FIG. 2 is a perspective view of an adjustment module for adjusting a position of a lens of a projector according to an embodiment of the present invention, and FIG. 3 is a front view of the adjustment module in FIG. 2. Referring to FIGS. 2 and 3, the adjustment module 100 of the embodiment may adjust a position of a lens 50 of a projector.

The adjustment module 100 includes a base 110, a first tray 120, a second tray 130, a plurality of guide rollers 140, and a plurality of boundary constrainers 150. The base 110 is, for example, a part of an optical engine of the projector. The first tray 120 is slidably disposed on the base 110 along a first axis Y. The second tray 130 is slidably disposed on the first tray 120 along a second axis X substantially perpendicular to the first axis Y. The lens 50 is fixed on the second tray 130. The guide rollers 140 are rotatably disposed on the second tray 130. The boundary constrainers 150 are fixed on the base 110, and the guide rollers 140 are capable of confining the lens 50 within an image area of the lens 50 by being rotatably in contact with the boundary constrainers 150.

In this embodiment, the number of the guide roller 140 and the number of the boundary constrainer 150 are for examples, but not limited to multiple. Those skilled in the art can dispose guide rollers 140 and boundary constrainers 150 of a different number depending on practical situations. For example, only one guide roller 140 and one boundary constrainer 150 are disposed, so as to confine the position of the lens 50 within an image area of the lens 50. In specific, the boundary constrainers 150 is designed according to a movement range 60, and the movement range 60 is designed in correspondence with the image area of the lens 50. As such, when a lens center 50a is confined in the movement range 60, the lens 50 can be confined in the image area.

For example, when a user moves the lens center 50a from Point A to Point A' along the first axis Y, the guide rollers 140 moves from Point a to Point a' to make contact with the boundary constrainers 150 correspondingly. When the user continues to move the lens 50 in a positive direction of the first axis Y, the guide rollers 140 moves to Point b along the boundary constrainers 150, so that the lens center 50a moves to Point B correspondingly. That is, the lens 50 reaches the uppermost point of the image area.

In this embodiment, the guide rollers 140 and the boundary constrainers 150 are used to confine the movement range 60 of the lens 50. Therefore, when the lens 50 moves to the boundary of the image area, the guide rollers 140 make contact with the boundary constrainers 150 respectively, and thus the lens 50 is guided to the uppermost point, the lowermost point, the leftmost point, or the rightmost point of the image area. That is to say, when the user intends to adjust the lens 50 to the uppermost or lowermost point of the image area, the user only needs to adjust the lens 50 along the first axis Y. To adjust the lens 50 to the leftmost or rightmost point of the image area, the user only needs to adjust the lens 50 along the second axis X. As such, the user can use the lens 50 more conveniently.

In this embodiment, the adjustment module 100 may further include a first rack rail 160a and a first adjusting gear 160b. The first rack rail 160a is fixed on the first tray 120, and the first adjusting gear 160b is pivotally disposed on the base 110 and engaged with the first rack rail 160a. The first adjusting gear 160b is rotated to drive the first rack rail 160a, and further to drive the first tray 120. Therefore, the user can rotate the first adjusting gear 160b to adjust the position of the lens 50 along the first axis Y.

In addition, the adjustment module 100 may further include a second rack rail 170a, a second adjusting gear 170b, and an elastic element 170c. The second rack rail 170a is slidably disposed on the second tray 130, and the second adjusting gear 170b is pivotally disposed on the base 110. The elastic element 170c is disposed between the second tray 130 and the second rack rail 170a, so as to force the second rack rail 170a to be engaged with the second adjusting gear 170b. Therefore, the user can rotate the second adjusting gear 170b to adjust the position of the lens 50 along the second axis X.

FIG. 4 is a partial cross-sectional view of the adjustment module in FIG. 2, and FIG. 5 is a partial cross-sectional view of the adjustment module in FIG. 4 when the adjustment module is adjusted along the first axis. Referring to FIGS. 4 and 5, in this embodiment, the second rack rail 170a is locked on the second tray 130 through a plurality of gap screws 170d, and the gap screws 170d limit the movement range of the second rack rail 170a relative to the second tray 130 along the first axis Y, so that the second rack rail 170a is kept to be engaged with the second adjusting gear 170b through the gap screws 170d and the elastic element 170c. When the user adjusts the lens 50 (see FIG. 3) along the first axis Y, the second tray 130 moves along the first axis Y, and the second rack rail 170a still abuts on the second adjusting gear 170b by virtue of the elastic element 170c, so as to maintain the engaging state of the second rack rail 170a and the second adjusting gear 170b. Therefore, when the user adjusts the position of the lens 50 (see FIG. 3), the position of the second adjusting gear 170b relative to the second rack rail 170a is not changed along with the move of the lens 50.

FIGS. 6-9 illustrate a process of assembling the adjustment module in FIG. 2. Firstly, referring to FIGS. 6 and 7, in this embodiment, the first tray 120 further includes a plurality of first sliding sleeves 122 and a plurality of first sliding rod 124. The first sliding rod 124s are fixed on the base 110, and the first sliding sleeves 122 are fitted on the first sliding rods 124 respectively. The first tray 120 is fixed on the first sliding sleeves 122, so as to move along the first axis Y.

Figure 8:
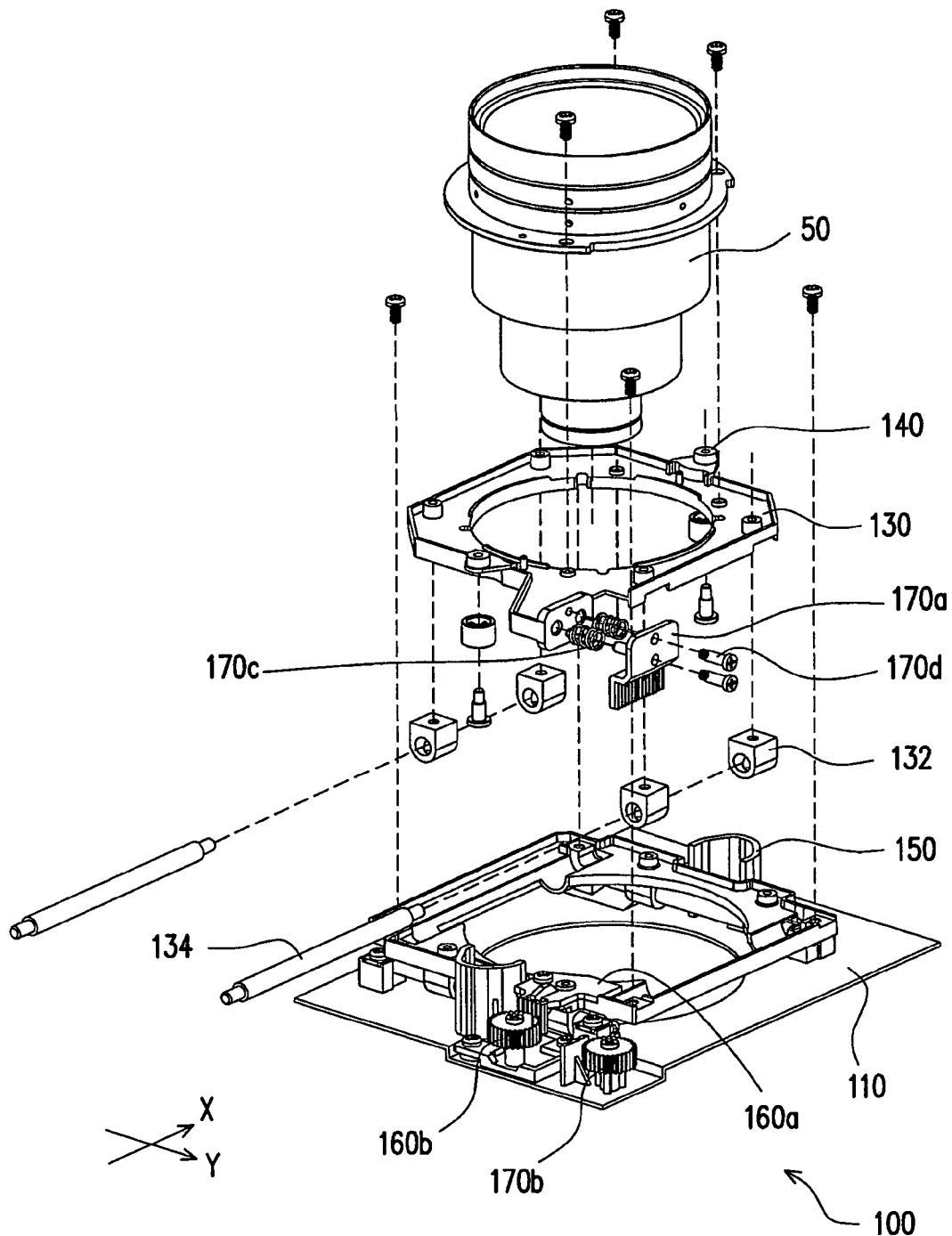
Figure 9:
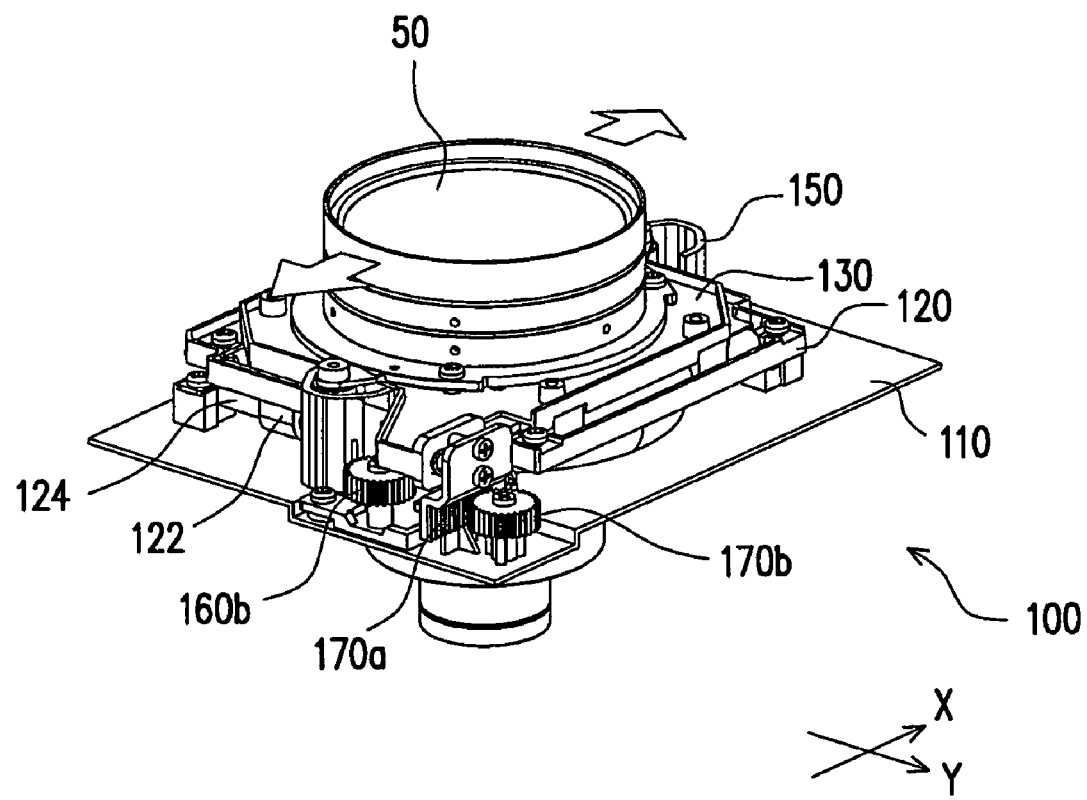

Referring to FIGS. 8 and 9 together, the second tray 130 further includes a plurality of second sliding sleeves 132 and a plurality of second sliding rods 134. The second sliding rods 134 are fixed on the first tray 120, and the second sliding sleeves 132 are fitted on the second sliding rods 134 respectively. The second tray 130 is fixed on the second sliding sleeves 132, so as to move along the second axis X.

It should be noted that, the manner of adjusting the position of the first tray 120 along the first axis Y is not limited to the implementation manner of the first rack rail 160a and the first adjusting gear 160b.

Figure 10:
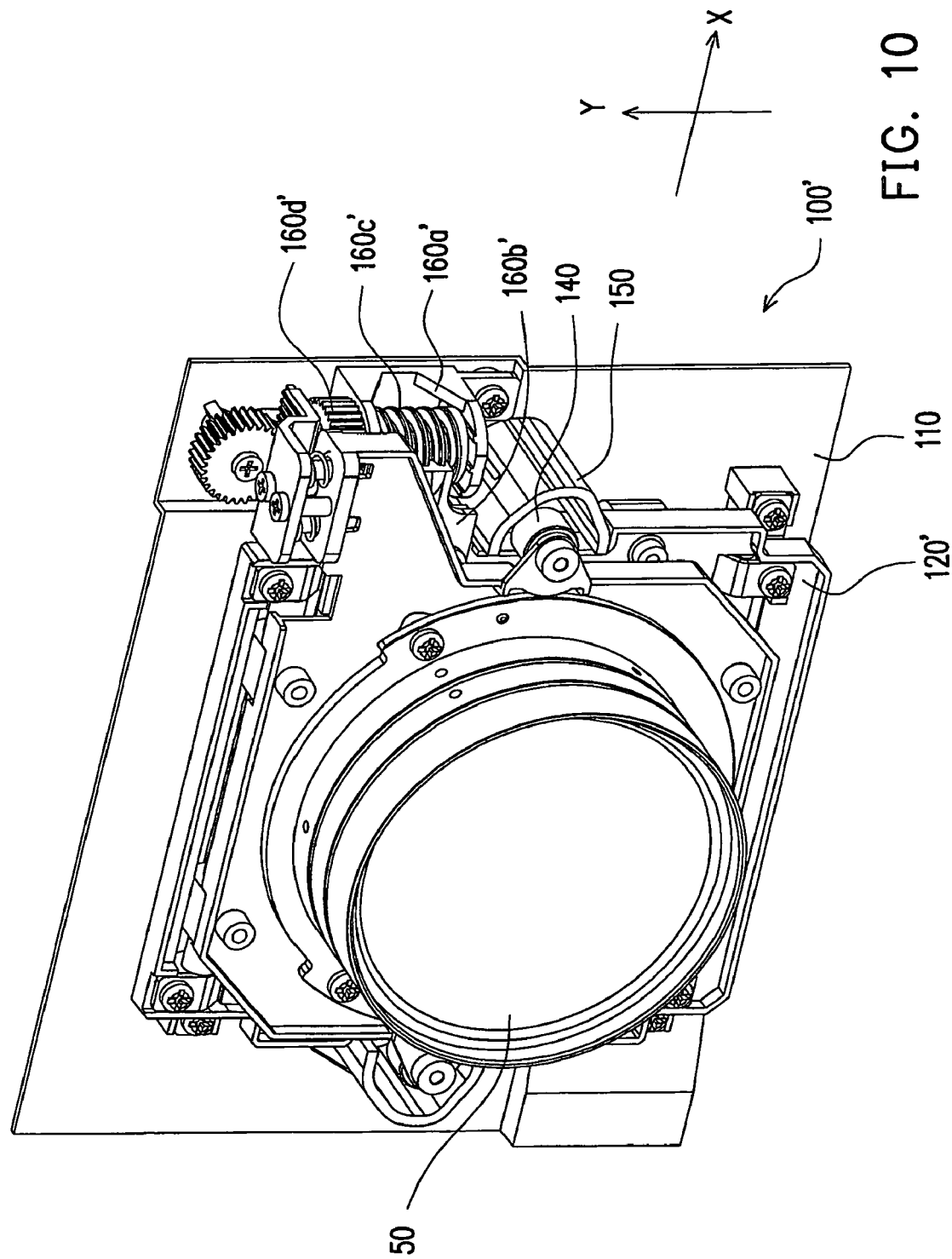
FIG. 10 is a perspective view of an adjustment module for adjusting a position of a lens of a projector according to another embodiment of the present invention.
Figure 11:
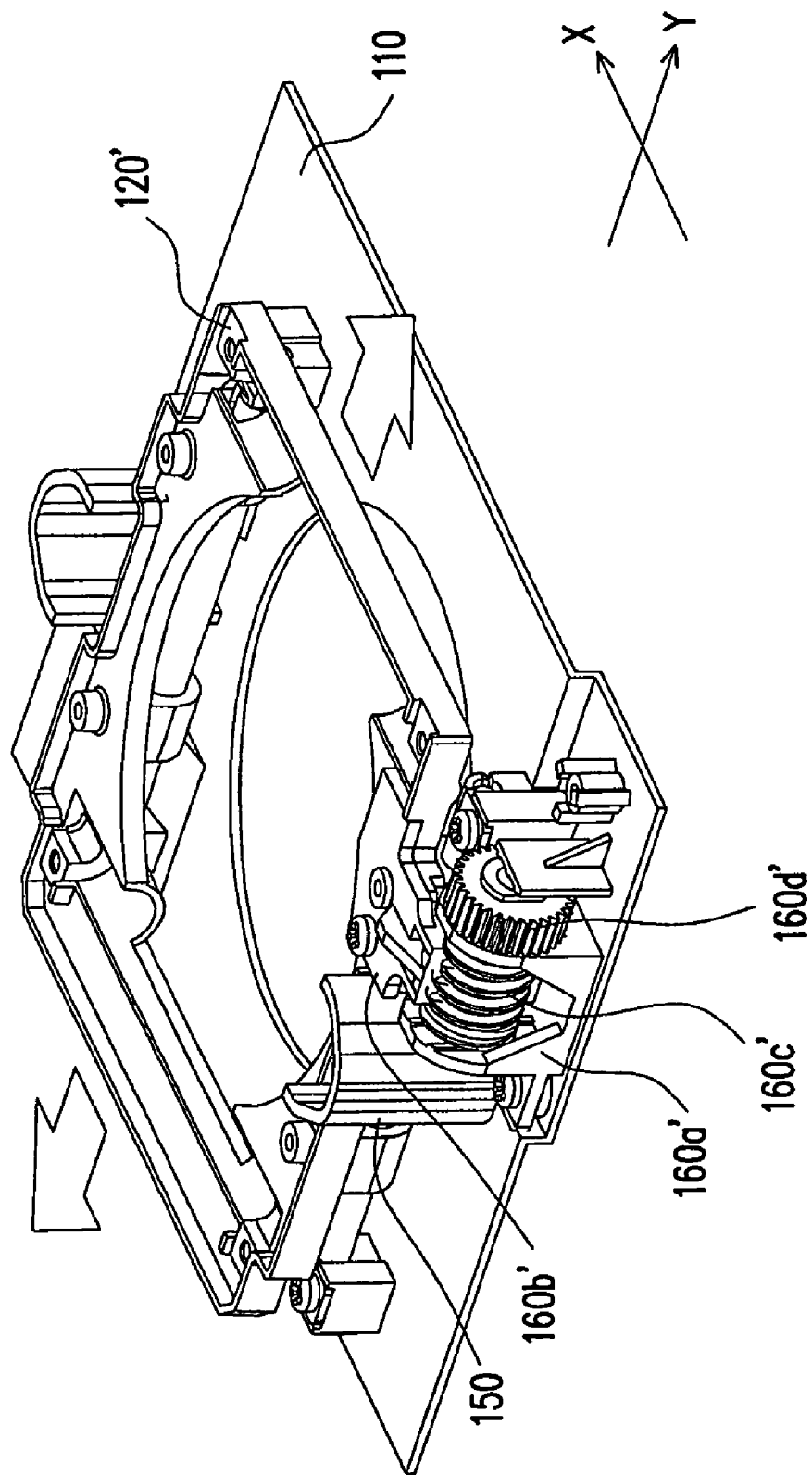
FIG. 11 illustrates some parts of the adjustment module in FIG. 10.
Figure 12:
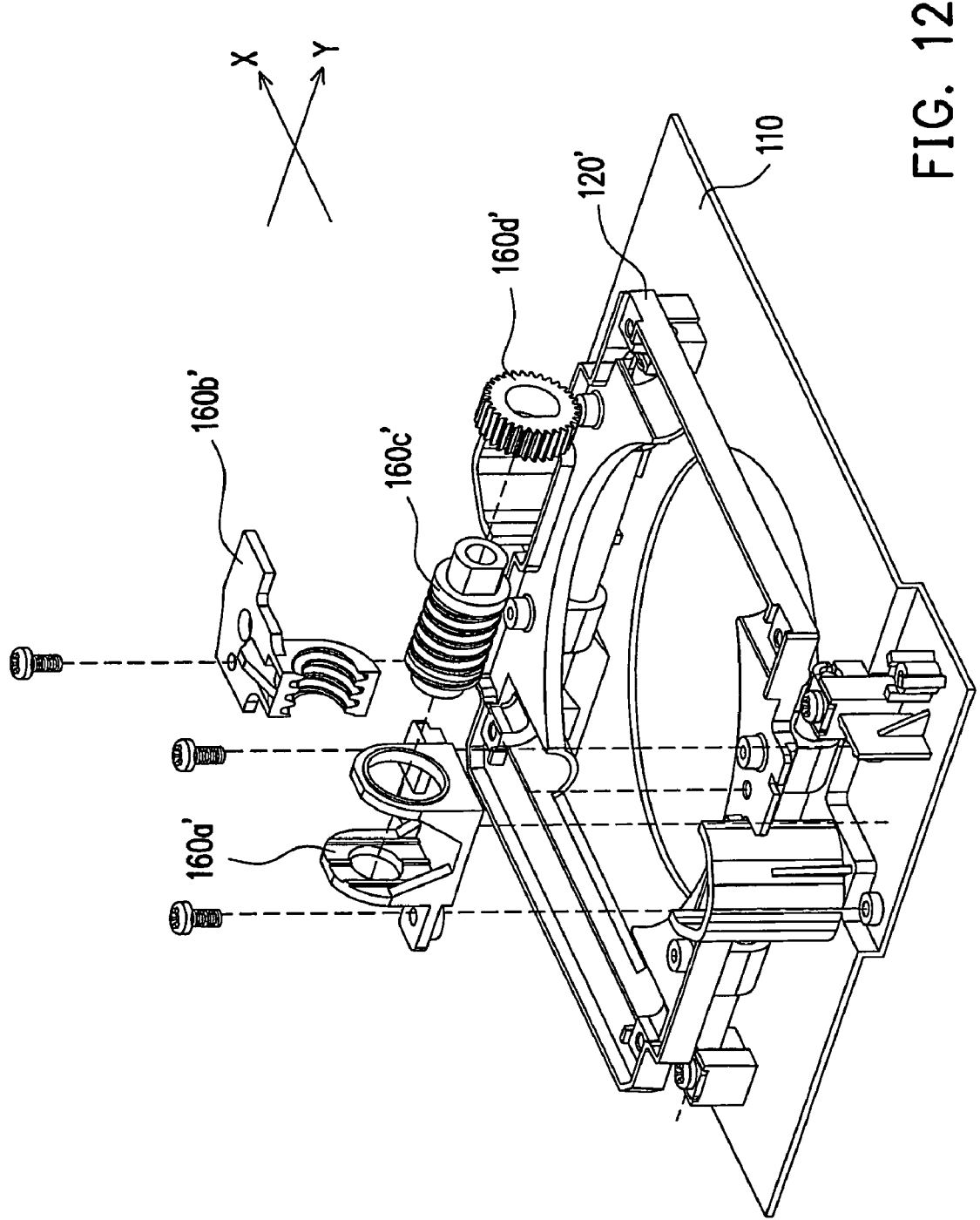
FIG. 12 is an exploded view of FIG. 11.

FIG. 10 is a perspective view of an adjustment module for adjusting a position of a lens of a projector according to another embodiment of the present invention, FIG. 11 illustrates some parts of the adjustment module in FIG. 10, and FIG. 12 is an exploded view of FIG. 11. Referring to FIGS. 10-12, the adjustment module 100' of the embodiment is similar to the embodiment in FIG. 2, and includes a leadscrew holder 160a', a leadscrew mate 160b', a leadscrew 160c', and a first adjusting knob 160d'. The leadscrew holder 160a' is fixed on the base 110, and the leadscrew mate 160b' is fixed on the first tray 120'. The leadscrew 160c' passes through the leadscrew holder 160a', and engaged with the leadscrew mate 160b', and the first adjusting knob 160d' is securely connected to the leadscrew 160c'.

The user rotates the first adjusting knob 160d' to make the leadscrew 160c' rotate, and the rotation of the leadscrew 160c' drives the leadscrew mate 160b', thereby making the first tray 120' move along the first axis Y. In the adjustment module 100' of the embodiment, the leadscrew 160c' and the leadscrew mate 160b' are used to replace the first rack rail 160a and the first adjusting gear 160b disclosed in the embodiment in FIG. 3. Therefore, the first tray 120' is not influenced by the weight of the lens 50 (see FIG. 10) to move along the positive or negative direction of the first axis Y. As such, the adjustment module 100' can be used to carry a heavy lens.

In the aforementioned embodiment, the guide rollers 140 and the boundary constrainers 150 are used to confine the position of the lens 50 in the image area. However, the present invention is not limited to this and can be implemented by those skilled in the art in other manners.

Figure 13:
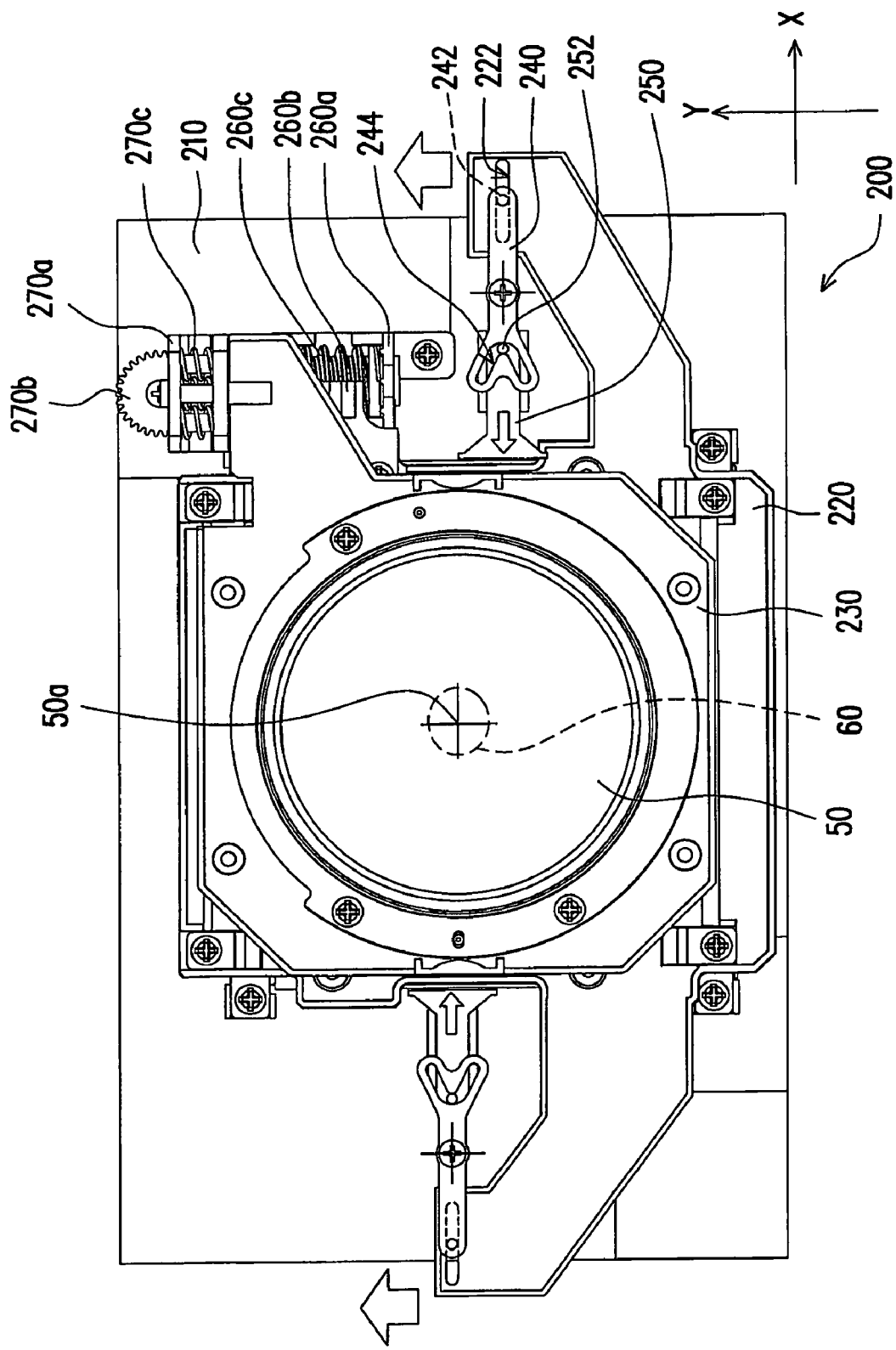
FIG. 13 is a top view of an adjustment module for adjusting a position of a lens of a projector according to yet another embodiment of the present invention.
Figure 14:
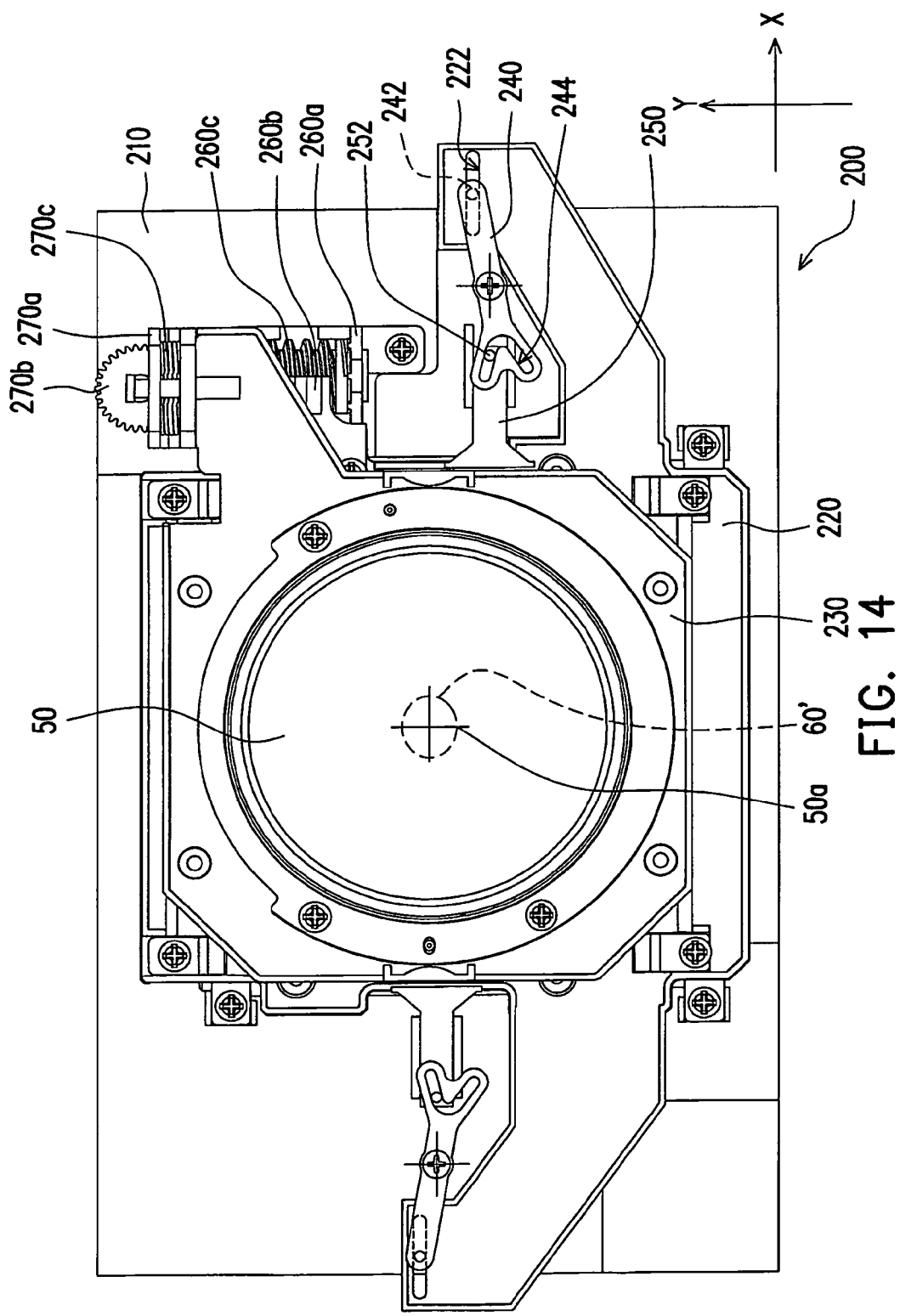
FIG. 14 illustrates the adjustment module in FIG. 13 when the adjustment module is adjusted along the first axis.

FIG. 13 is a top view of the adjustment module for adjusting a position of a lens of a projector according to yet another embodiment of the present invention, and FIG. 14 illustrates the adjustment module in FIG. 13 when the adjustment module is adjusted along the first axis. Referring to FIGS. 13 and 14, the adjustment module 200 includes a base 210, a first tray 220, a second tray 230, a plurality of rocker arms 240, and a plurality of slider blocks 250. The first tray 220 is disposed on the base 210 slidably along a first axis Y and has a first driving groove 222. The second tray 230 is disposed on the first tray 220 slidably along a second axis X substantially perpendicular to the first axis Y. The lens 50 is fixed on the second tray 230. The base 210, the first tray 220, and the second tray 230 are disposed in the similar manner as that of the base 110, the first tray 120, and the second tray 130 in FIGS. 6-9.

The rocker arms 240 are pivotally disposed on the base 210, and each has a first driven post 242 capable of moving in the first driving groove 222 and a second driving groove 244. The slider blocks 250 are disposed on the base 210 slidably substantially along the first axis Y, and each has a second driven post 252 capable of moving in the second driving groove 244. The slide of the first tray 220 along the first axis Y drives the rocker arms 240 to rotate by virtue of the first driving groove 222 and the first driven posts 242, and the rotation of the rocker arms 240 drives the slider blocks 250 to slide along the second axis X by virtue of the second driving grooves 244 and the second driven posts 252. In this manner, the slider blocks 250 slide in correspondence with the sliding of the first tray 220, so as to confine a sliding range of the second tray 230 sliding along the second axis X and to confine the position of the lens 50 within an image area of the lens 50. In detail, the second driving grooves 244 is designed according to a movement range 60', and the movement range 60' is designed in correspondence with an image area of the lens 50. As such, when the lens center 50a is confined within the movement range 60', the lens 50 will be confined within the image area accordingly.

When the first tray 220 moves in the positive direction of the first axis Y, the first driving groove 222 on the first tray 220 drives the first driven posts 242 on the rocker arms 240 to move in the positive direction of the first axis Y, and to drive the second driving grooves 244 on the rocker arms 240 to move toward the negative direction of the first axis Y. The second driving grooves 244 move to drive the second driven posts 252 on the slider blocks 250, so that the slider blocks 250 get close to the second tray 230 to narrow a sliding range of the second tray 230 along the second axis X, thereby further confining the movement of the lens 50 to the image area.

In this embodiment, the adjustment module 200 may include a leadscrew holder 260a, a leadscrew mate 260b, a leadscrew 260c, and a first adjusting knob 260d. The leadscrew holder 260a, the leadscrew mate 260b, the leadscrew 260c, and the first adjusting knob 260d are implemented in the same manner as that of the leadscrew holder 160a', the leadscrew mate 160b', the leadscrew 160c', and the first adjusting knob 160d' of the adjustment module 100' in FIG. 10, so the details will not be repeated herein. According to another embodiment not shown, the leadscrew holder 260a, the leadscrew mate 260b, the leadscrew 260c, and the first adjusting knob 260d of the adjustment module 200 may also be replaced by parts such as the first rack rail 160a and the first adjusting gear 160b of the adjustment module 100 in FIG. 2, so that the first tray 220 moves along the first axis Y.

In this embodiment, the adjustment module 200 may further include a second rack rail 270a, a second adjusting gear 270b, and an elastic element 270c. The second rack rail 270a, the second adjusting gear 270b, and the elastic element 270c are implemented in the same manner as that of the second rack rail 170a, the second adjusting gear 170b, and the elastic element 170c of the adjustment module 100 in FIG. 2, and the details will not be repeated herein.

In view of the above, in the embodiments of the present invention, the guide rollers and the boundary constrainers (or the slider blocks and the rocker arms) are used to confine the movement range of the lens. Therefore, when the lens moves to the boundary of the image area, the guide rollers come in contact with the boundary constrainers so that the lens can be guided to the uppermost or lowermost point of the image area. That is to say, when the user intends to adjust the lens to the uppermost or lowermost point of the image area, the user only needs to adjust the lens along the first axis (Y). If the lens reaches the boundary of the image area before reaching the uppermost or lowermost point, the user only needs to continue adjusting the lens along the first axis, and the lens can be guided to the uppermost or lowermost point of the image area. In this manner, the user can adjust the lens more conveniently.

Furthermore, in the embodiments of the present invention, when the user intends to adjust the lens to the leftmost or rightmost point of the image area, the user only needs to adjust the lens along the second axis (X). If the lens reaches the boundary of the image area before reaching the leftmost or rightmost point, the user only needs to continue adjusting the lens along the second axis, and the lens can be guided to the leftmost or rightmost point of the image area.

Additionally, in some of the embodiments, the adjustment modules have a leadscrew and other parts that work in conjunction with the leadscrew, so as to adjust the position of the lens in the first axis. As such, the adjustment module will not be influenced the weight of the lens to make the lens to produce a shift along the first axis (Y). Therefore, the adjustment modules can be used to carry a heavy lens.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An adjustment module for adjusting a position of a lens of a projector, comprising:
   a base;
   a first tray, disposed on the base slidably along a first axis;
   a second tray, disposed on the first tray slidably along a second axis substantially perpendicular to the first axis, wherein the lens is fixed on the second tray;
   at least one guide roller, rotatably disposed on the second tray; and
   at least one boundary constrainer, fixed on the base, wherein the guide roller is capable of confining the lens within an image area of the lens by being rotatably in contact with the boundary constrainer.

2. The adjustment module as claimed in claim 1, comprising:
   a first rack rail, fixed on the first tray; and
   a first adjusting gear, pivotally disposed on the base and engaged with the first rack rail.

3. The adjustment module as claimed in claim 1, further comprising:
   a leadscrew holder, fixed on the base;
   a leadscrew mate, fixed on the first tray;
   a leadscrew, passing through the leadscrew holder, and engaged with the leadscrew mate; and
   a first adjusting knob, securely connected to the leadscrew.

4. The adjustment module as claimed in claim 1, further comprising:
   a second rack rail, slidably disposed on the second tray;
   a second adjusting gear, pivotally disposed on the base; and
   an elastic element, disposed between the second tray and the second rack rail, and forcing the second rack rail to be engaged with the second adjusting gear.

5. An adjustment module for adjusting a position of a lens of a projector, comprising:
   a base;
   a first tray, disposed on the base slidably along a first axis and having a first driving groove;
   a second tray, disposed on the first tray slidably along a second axis substantially perpendicular to the first axis, wherein the lens is fixed on the second tray;
   at least one rocker arm, pivotally disposed on the base and having a second driving groove and a first driven post capable of moving in the first driving groove; and
   at least one slider block, disposed on the base slidably substantially along the first axis, and having a second driven post capable of moving in the second driving groove, wherein the first tray slides to drive the rocker arm to rotate by virtue of the first driving groove and the first driven post, the rocker arm rotates to drive the slider block to slide by virtue of the second driving groove and the second driven post, and the slider block slides in correspondence with the sliding of the first tray to confine a sliding range of the second tray sliding along the second axis and to confine a position of the lens within an image area of the lens.

6. The adjustment module as claimed in claim 5, further comprising:
   a first rack rail, fixed on the first tray; and
   a first adjusting gear, pivotally disposed on the base and engaged with the first rack rail.

7. The adjustment module as claimed in claim 5, further comprising:
   a leadscrew holder, fixed on the base;
   a leadscrew mate, fixed on the first tray;
   a leadscrew, passing through the leadscrew holder, and engaged with the leadscrew mate; and
   a first adjusting knob, securely connected to the leadscrew.

8. The adjustment module as claimed in claim 5, further comprising:
   a second rack rail, slidably disposed on the second tray;
   a second adjusting gear, pivotally disposed on the base; and
   an elastic element, disposed between the second tray and the second rack rail, and forcing the second rack rail to be engaged with the second adjusting gear.

* * * * *